(12) United States Patent
Drost et al.

(10) Patent No.: US 10,900,596 B2
(45) Date of Patent: Jan. 26, 2021

(54) SPHERICAL FLANGE JOINT

(71) Applicant: CUMMINS IP, INC., Minneapolis, MN (US)

(72) Inventors: Jason Drost, Edgerton, WI (US); Robert Schellin, Stoughton, WI (US)

(73) Assignee: Cummins IP, Inc., Minneapolis, MN (US)

( * ) Notice: Subject to any disclaimer, the term of this patent is extended or adjusted under 35 U.S.C. 154(b) by 332 days.

(21) Appl. No.: 15/879,315

(22) Filed: Jan. 24, 2018

(65) Prior Publication Data

US 2018/0149295 A1 May 31, 2018

Related U.S. Application Data

(62) Division of application No. 12/893,959, filed on Sep. 29, 2010, now Pat. No. 9,909,698.

(60) Provisional application No. 61/246,842, filed on Sep. 29, 2009.

(51) Int. Cl.
| | |
|---|---|
| *F16L 23/04* | (2006.01) |
| *F01N 13/18* | (2010.01) |
| *F16L 27/10* | (2006.01) |

(52) U.S. Cl.
CPC .......... *F16L 23/04* (2013.01); *F01N 13/1811* (2013.01); *F16L 27/1012* (2013.01)

(58) Field of Classification Search
CPC ..... F16L 23/024; F16L 23/026; F16L 23/028; F16L 23/0283; F16L 23/0286; F16L 23/08; F16L 23/10; F16L 23/18; F16L 23/24; F16L 19/041; F16L 19/043; F16L 19/065; F16L 19/0656; F01N 13/1805; F01N 13/1811; F01N 13/1827

USPC ............ 285/334.1, 334.2, 334.3, 334.5, 365
See application file for complete search history.

(56) References Cited

U.S. PATENT DOCUMENTS

| | | | |
|---|---|---|---|
| 1,959,630 A | 5/1934 | Julius | |
| 1,977,241 A | 10/1934 | Parker | |
| 2,269,664 A | 1/1942 | Hallerberg | |
| 3,265,413 A | 8/1966 | Currie | |
| 3,432,189 A | 3/1969 | Buller | |

(Continued)

FOREIGN PATENT DOCUMENTS

| | | |
|---|---|---|
| CN | 1599851 | 3/2005 |
| FR | 2867511 A1 | 9/2005 |

(Continued)

OTHER PUBLICATIONS

Chinese and English language translation issued for Chinese patent application No. 201510152512.4, dated Jul. 25, 2016, 12 pages.

(Continued)

*Primary Examiner* — James M Hewitt, II
(74) *Attorney, Agent, or Firm* — Foley & Lardner LLP

(57) ABSTRACT

According to one embodiment, a flange joint for joining a first pipe to a second pipe includes an adapter coupled to the first pipe. The adapter includes a convex surface. The flange joint also includes a gasket with a first concave surface and a second convex surface. The first concave surface of the gasket is matingly engageable with the convex surface of the adapter. The second convex surface is matingly engageable with the second pipe. The gasket is supported on the first pipe. The flange joint further includes a clamp that includes a concave surface that is matingly engageable with the second pipe to secure the gasket to the adapter.

18 Claims, 8 Drawing Sheets

(56) References Cited

U.S. PATENT DOCUMENTS

| | | | |
|---|---|---|---|
| 3,498,649 | A | 3/1970 | Pfeuffer |
| 3,820,831 | A | 6/1974 | Swedelius |
| 3,865,413 | A | 2/1975 | Mizusawa et al. |
| 3,964,773 | A | 6/1976 | Stade et al. |
| 3,985,377 | A | 10/1976 | Ahola et al. |
| 4,071,269 | A | 1/1978 | Halling et al. |
| 4,209,177 | A | 6/1980 | Hall |
| 4,693,502 | A | 9/1987 | Oetiker |
| 4,832,380 | A | 5/1989 | Oetiker |
| 5,505,498 | A | 4/1996 | Halling et al. |
| 5,661,976 | A | 9/1997 | Clanton |
| 6,152,453 | A | 11/2000 | Kashima et al. |
| 6,164,067 | A | 12/2000 | Cronje |
| 7,172,202 | B2 | 2/2007 | Kubota et al. |
| 7,393,020 | B2 | 7/2008 | Hartig et al. |
| 7,399,005 | B2 | 7/2008 | Rigollet et al. |
| 8,328,243 | B2 | 12/2012 | Matthis et al. |
| 2006/0082154 | A1 | 4/2006 | Hartig et al. |
| 2008/0277016 | A1 | 11/2008 | Covers et al. |
| 2010/0187771 | A1 | 7/2010 | Waltenberg et al. |

FOREIGN PATENT DOCUMENTS

| | | |
|---|---|---|
| FR | 2906864 A1 | 4/2008 |
| JP | 09-133276 | 5/1997 |
| JP | 2006-009914 | 1/2006 |
| KR | 100776367 | 11/2007 |
| KR | 10904419 | 6/2009 |

OTHER PUBLICATIONS

Office Action issued for European Patent Application No. 10 821 191.3, dated Mar. 22, 2016, 5 pages.
First Office Action for Chinese Patent App. No. 201080053740.1 dated Nov. 20, 2013, 25 pages (with translation).

SPHERICAL FLANGE JOINT

CROSS-REFERENCE TO RELATED APPLICATION

This application is a divisional of U.S. patent application Ser. No. 12/893,959, filed on Sep. 29, 2010, which claims the benefit of U.S Provisional Patent Application No. 61/246,842, filed Sep. 29, 2009, the contents of which are incorporated herein by reference in their entirety.

FIELD

This disclosure relates to flange joints for joining together two components, and more particularly to spherical-type flange joints for joining together two components while accommodating for angular misalignment between the two components.

BACKGROUND

Flange-type joints are widely used to couple two components together. Generally, each component includes an attached or integral flange. The flanges of the components are brought together and secured to each other to form a joint using various techniques. One conventional technique includes clamping the flanges together using a clamping device. Often, a sealing member, such as a gasket, is positioned between the flanges to prevent material from passing between the flanges. In certain automotive applications, flange-type joints couple together opposing tubes used to contain a flow of material, such as air, exhaust, etc. Accordingly, a gasket is used to seal the flange-type joint to prevent leakage of the material flowing through the tubes.

Many conventional flange-type joints fail to accommodate for angular misalignment between the coupled components. Often, typical flange-type joints are designed to couple together only coaxially aligned or parallel components. However, in certain automotive applications, coupling together intentionally or unintentionally misaligned (i.e., not coaxial or parallel) tubes may be desirable. For example, exhaust tubes may be intentionally misaligned to avoid or make room for other components within the exhaust or other automotive system. Alternatively, exhaust tubes may be unintentionally misaligned due to manual error when coupling the tubes together. Most conventional flange-type joints would not adequately function to properly couple together intentionally or unintentionally misaligned components.

Some conventional joints have been designed to accommodate for angular misalignment between coupled components. While such joints may provide at least some partial coupling of misaligned components, generally these joints fail to provide an adequate seal between the components for preventing material from leaking through the joint. Also, certain of these conventional joints may accommodate only a less-than-desirable amount of misalignment.

Certain typical flange-type joints for coupling together components often are susceptible to undesirable backpressure increases within the components, which can choke the system and result in undesirable consequences. Such backpressure increases can be caused when one component has a significantly reduced inner dimension (e.g., diameter) compared to the inner dimension of the other component.

Additionally, many typical flange-type joints that employ a gasket are difficult to assemble and fail to ensure proper sealing. For example, gaskets in typical joints are manually held in place during assembly of the joint, especially in vertically-oriented applications. Moreover, gaskets, which should be centered relative to the components, are prone to shifting out of center with the components during and after installation. Also, most gaskets used in conventional flange-type joints fail to accommodate for variances in component size, which can lead to improper seating of the gasket and leaking.

SUMMARY

The subject matter of the present application has been developed in response to the present state of the art, and in particular, in response to the problems and needs in the art that have not yet been fully solved by currently available flange-type joints. Accordingly, the subject matter of the present application has been developed to provide a spherical flange joint, and associated apparatus and systems, that overcomes at least some shortcomings of the prior art flange-type joints.

According to one embodiment, a flange joint for joining a first pipe to a second pipe includes an adapter coupled to the first pipe. The adapter includes a convex surface. The flange joint also includes a gasket with a first concave surface and a second convex surface. The first concave surface of the gasket is matingly engageable with the convex surface of the adapter. The second convex surface is matingly engageable with the second pipe. The gasket is supported on the first pipe. The flange joint further includes a damp that includes a concave surface that is matingly engageable with the second pipe to secure the gasket to the adapter.

In some implementations, the convex surface of the adapter of the flange joint includes a first radius of curvature, the first concave surface of the gasket includes a second radius of curvature, the second convex surface of the gasket includes a third radius of curvature, and the concave surface of the clamp includes a fourth radius of curvature. The first radius of curvature can be equal to the second radius of curvature, the first and second radii of curvature each can be less than the third radius of curvature, and the third radius of curvature can be less than the fourth radius of curvature.

According to certain implementations, the convex surface of the adapter of the flange joint is a first convex surface and the adapter further includes a second convex surface. Moreover, the concave surface of the clamp can be a first concave surface with the clamp further including a second concave surface. The second concave surface of the clamp can be matingly engageable with the second convex surface of the adapter. A radius of curvature of the first convex surface of the adapter can be less than a radius of curvature of the second convex surface of the adapter in some implementations. In specific implementations, a radius of curvature of the first concave surface of the clamp can be equal to a radius of curvature of the second concave surface of the clamp.

The clamp of the flange joint can be symmetrical in cross-section in certain implementations. The gasket can include a ridge that is formed in at least one of the first concave and second convex surfaces of the gasket. According to some implementations, the adapter includes a hollow interior. The adapter may also have a generally V-shaped cross-section.

In some implementations, the gasket of the flange joint has a substantially annular shape defining a central opening. The gasket may further include a plurality of tabs extending at least partially into the opening. The adapter, gasket, and clamp can be configured to join the first and second pipes when the first and second pipes are angularly misaligned up to a predetermined angle. The predetermined angle can be about 2-degrees in certain implementations.

In another embodiment, a pipe assembly includes a first pipe that includes a first end portion, and a second pipe that includes a flared end portion that has a curved wall with a specific curvature. The pipe assembly also includes an adapter coupled to the first pipe. The adapter can include a curved surface with a curvature that corresponds with the specific curvature. Further, the pipe assembly includes a gasket positioned between the curved wall of the flared end portion and the curved surface of the adapter. The gasket has a curvature that corresponds with the specific curvature and the gasket is supported on the first pipe. The pipe assembly may further include a clamp that includes a curved surface with a curvature that corresponds with the specific curvature. The clamp can be tightenable to secure the curved wall of the flared end portion against the gasket and the gasket against the curved surface of the adapter.

The gasket of the pipe assembly can have a substantially annular shape that defines a central opening slightly larger than an outer periphery of the first pipe. The gasket can include at least one set of opposing tabs extending at least partially into the opening where a maximum distance between the opposing tabs being less than a diameter of the first pipe. The gasket may form a seal between the adapter and the flared end portion of the second pipe where the seal is maintained when the second pipe is misaligned relative to the second pipe. The gasket can extend radially outwardly from the first pipe to approximately a radially outermost periphery of the adapter.

In certain implementations, the pipe assembly further includes an annular reinforcement ring positioned between the flared end portion of the second pipe and the clamp. The pipe assembly can include an annular reinforcement ring coupled to an outer surface of the clamp. According to some implementations, the adapter can be formed in a wall of the first pipe.

According to yet another embodiment, a spherical joint assembly includes a first end portion of a first pipe where the first end portion has a non-flared end. The spherical joint assembly also includes a second end portion of a second pipe. The second end portion includes a flared end that has an inner surface with a first radius of curvature and an outer surface with a second radius of curvature. The second end portion further includes a step adjacent the flared end. Further, the spherical joint assembly includes an adapter that is coupled to the first end portion. The adapter includes a first curved surface with a third radius of curvature and a second curved surface with a fourth radius of curvature different than the third radius of curvature. The spherical joint assembly also includes a gasket positioned between the flared end of the second end portion and the first curved surface of the adapter. The gasket is supported by the first end portion of the first pipe and has an inner surface with the third radius of curvature and an outer surface with the first radius of curvature. The inner surface of the gasket mates with the first curved surface of the adapter and the outer surface of the gasket mates with the inner surface of the flared end portion. The gasket may further include an elevated ridge that sealingly engages the flared end of the second end portion. Additionally, the spherical joint assembly includes a damp that has a symmetrical V-hand with first and second curved surfaces. The first curved surface of the V-band has the second radius of curvature and the second curved surface of the V-band has the fourth radius of curvature. The first curved surface of the V-band mates with the outer surface of the flared end portion and the second curved surface of the V-band mates with the second curved surface of the adapter.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Furthermore, the described features, structures, or characteristics of the subject matter described herein may be combined in any suitable manner in one or more embodiments. In the following description, numerous specific details are provided, such as examples of controls, structures, devices, algorithms, programming, software modules, user selections, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
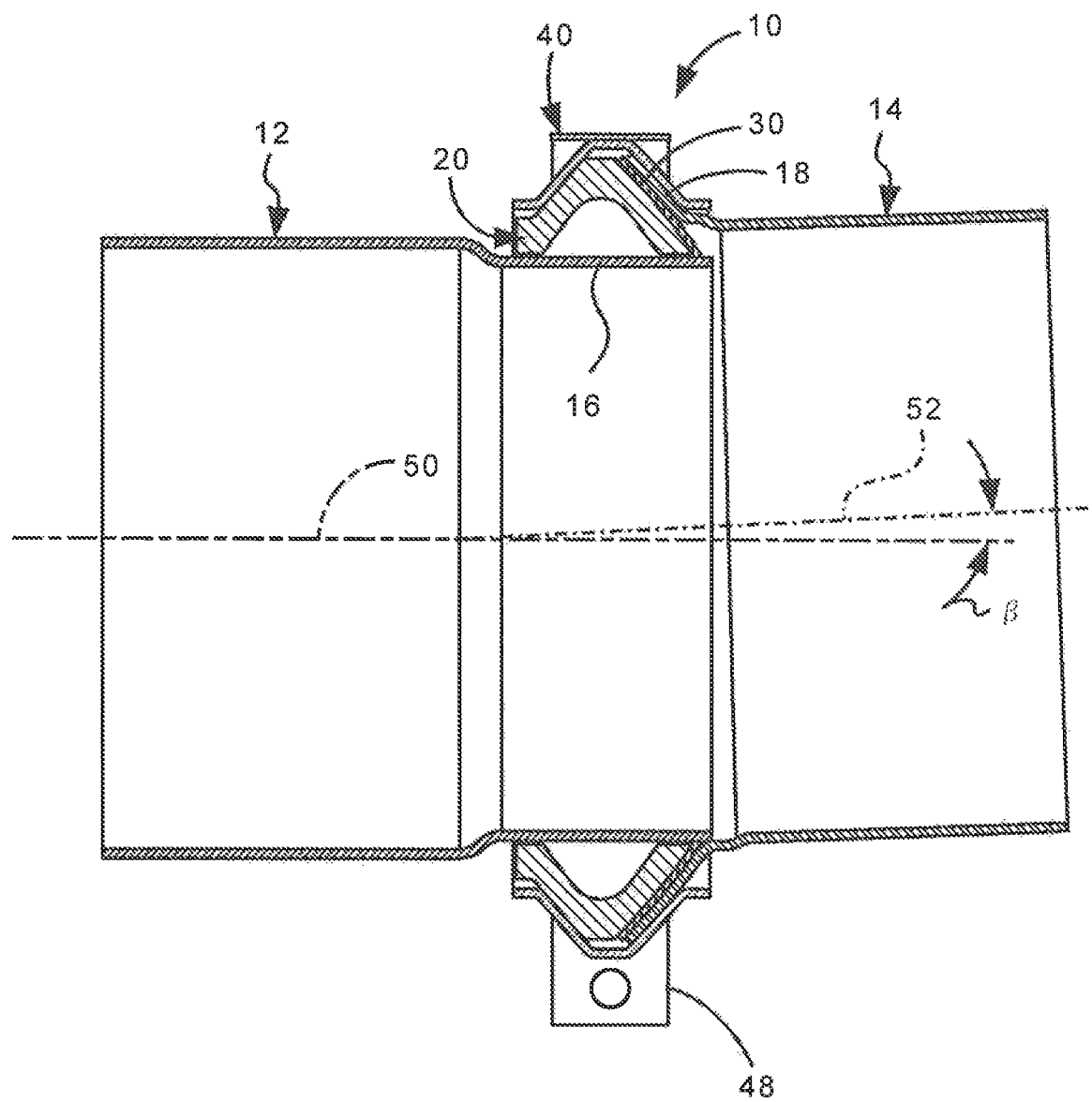
FIG. 1 is a cross-sectional side view of a pipe assembly with a spherical flange joint according to one embodiment.

FIG. 1 depicts one embodiment of a spherical flange joint 10 coupling a first pipe 12 to a second pipe 14. The spherical flange joint 10 is configured to retain a flared end portion 18 of the second pipe 14 relative to the first pipe 12 and provide a sealed engagement between the first and second pipes. More specifically, the spherical flange joint 10 facilitates a sealed engagement between the first and second pipe 12, 14 even with the second pipe 14 oriented at an angle β with respect to the first pipe. The angle β is defined as the included angle between a central axis 50 of the first pipe 12 and a central axis 52 of the second pipe 14. The angle β can be any of various angles. In one specific implementation, the angle β is between zero degrees and about two degrees. However, in some implementations, the angle β is greater than about two degrees.

The spherical flange joint 10 includes an adapter 20, a gasket 30, and a clamp 40. The adapter 20 is secured to an end portion 16 of the first pipe 12 about a periphery of the first pipe. In some implementations, the adapter 20 is secured to the end portion 16 by welding the adapter to the end portion. According to certain implementations, the adapter 20 is secured to the end portion 16 using other attachment techniques, such as adhesion, bonding, or fastening. The gasket 30 is supported on an exterior surface of the end portion 16 of the first pipe 12 and positioned between the adapter 20 and the flared end portion 18. The clamp 40 is positioned about the flared end portion 18, adapter 20, and gasket 30 such that at least a portion of the flared end portion, adapter, and clamp is positioned between the clamp. The clamp 40 includes a fastening mechanism 48 operable to tighten the clamp against the flared end portion 18 and adapter 20. Tightening of the fastening mechanism 48 against the flared end portion 18 and adapter 20 causes the flared end portion and adapter to tighten against the gasket 30 thus forming a seal. Generally, the flared end portion 18, adapter 20, gasket 30, and clamp 40 includes mating curved surfaces that allow the flared end portion 18, adapter 20, and gasket 30 to be tightened together to form a seal even if the second pipe 14 is misaligned with the first pipe 12.

Figure 2:
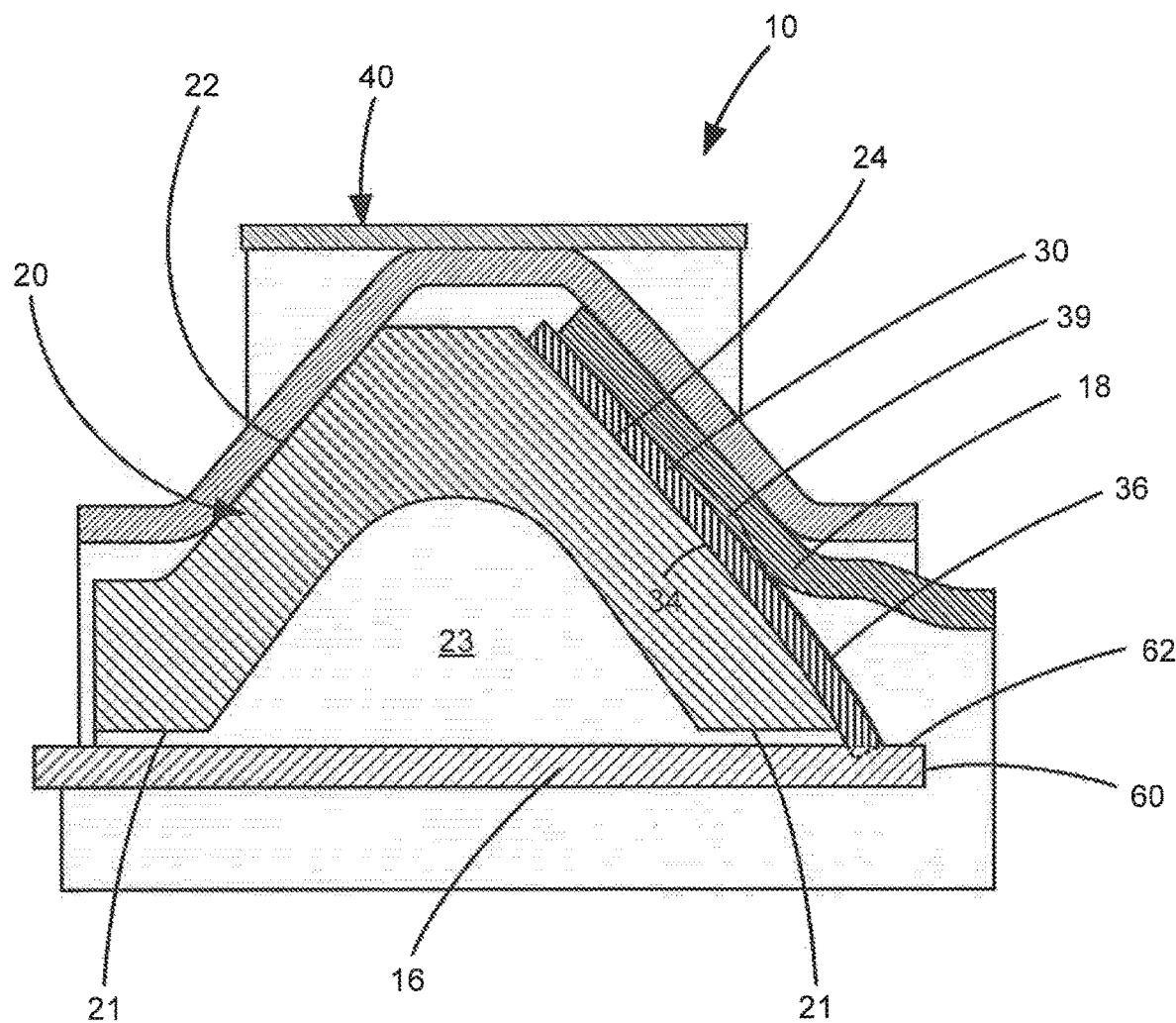
FIG. 2 is a cross-sectional side view of the spherical flange joint of FIG. 1.

Referring to FIG. 2, the adapter 20 is secured to the end portion 16 of the first pipe 12 just upstream of a downstream end 60 of the first pipe. The section of the first pipe 12 between the adapter 20 and the downstream end 60 defines a ledge 62. The adapter 20 has a substantially annular shape and is generally V-shaped in cross-section (see, e.g., FIG. 3). In other words, in certain implementations, the adapter 20 can be described as having a substantially triangular-shaped cross-section but with a hollow interior 23 (e.g., having a similar cross-sectional shape as a cone). The hollow interior of the adapter 20 results in a weight-savings and thus a reduction in induced stresses on the joint 10 and pipes 12, 14. In some embodiments, the adapter 20 does not have a hollow interior.

Figure 3:
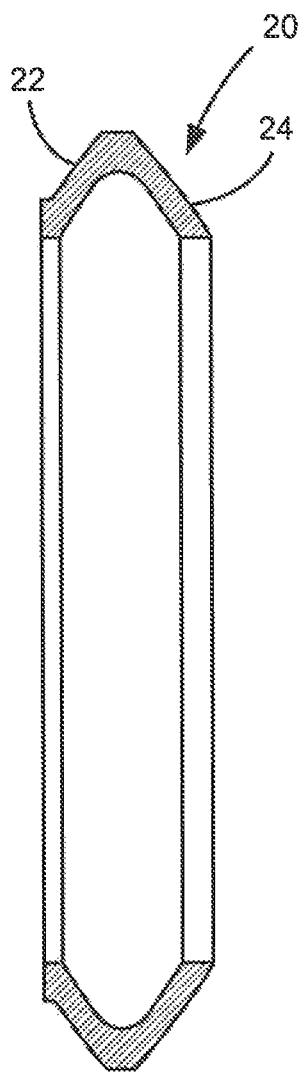
FIG. 3 is a cross-sectional side view of an adapter of a spherical flange joint according to one embodiment.

The adapter 20 includes two outer (e.g., exterior) contact surfaces angled with respect to the central axis 50 of the first pipe 12. As shown in FIGS. 2 and 3, the outer contact surfaces include an upstream surface 22 and a downstream surface 24. Preferably, the upstream and downstream surfaces 22, 24 respectively form the same included angle with respect to the central axis 50. Each of the upstream and downstream surfaces 22, 24 are. convex (e.g., outwardly rounded or curved). The upstream and downstream surfaces 22, 24 define respective curves having any of various radii. In some implementations, the radii of each curve can be between about 90 mm and about 110 mm. Preferably, the respective curves defined b the upstream and downstream surfaces 22, 24 have different radii to facilitate the use of a symmetrical clamp 40 as will be explained in more detail below. In specific implementations, the upstream surface 22 has a radius that is larger than the radius of the downstream surface 24 by approximately the combined thicknesses of the gasket 30 and the flared end portion 18 of the second pipe 14.

Figure 7:
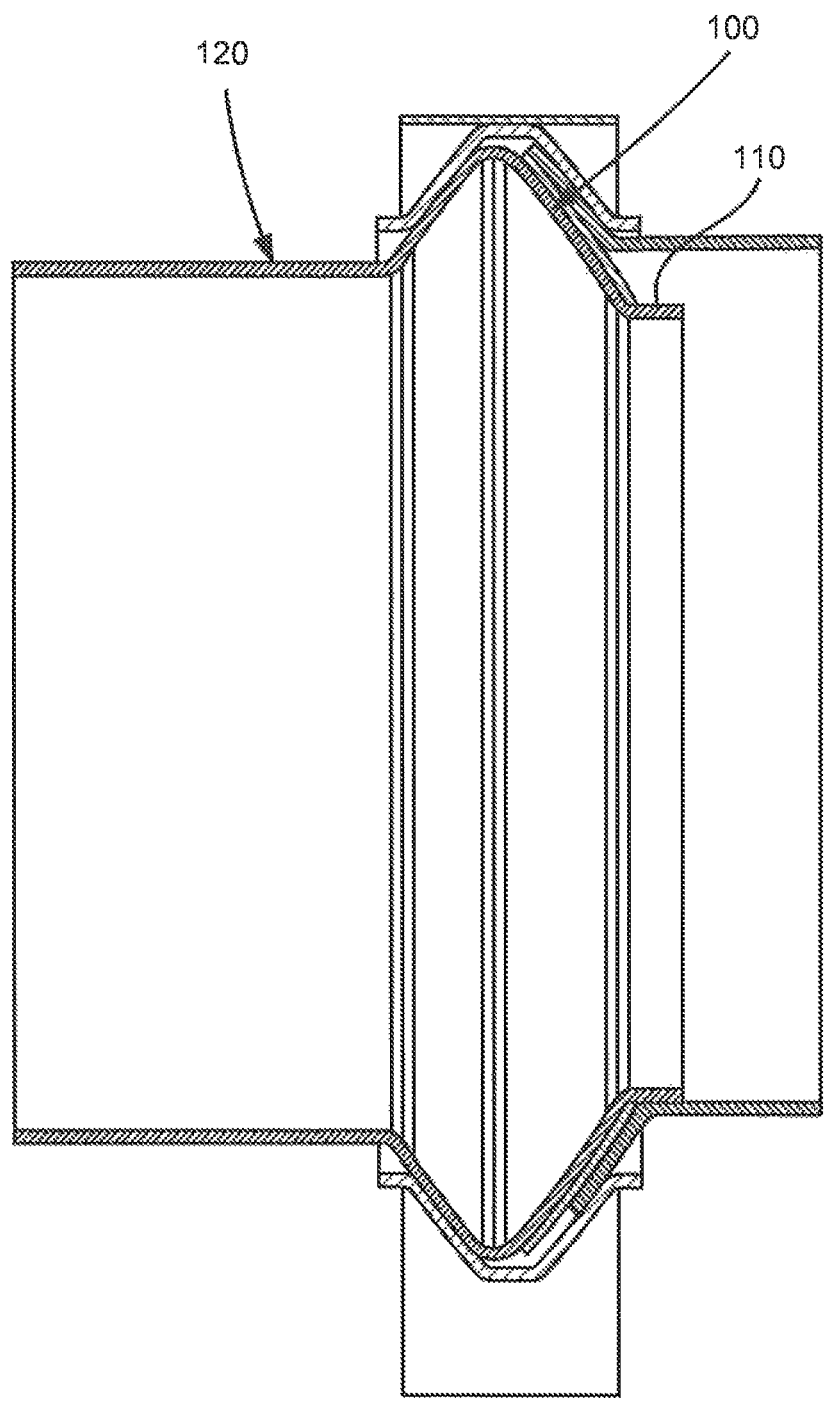
FIG. 7 is a cross-sectional side view of a pipe assembly with a spherical flange joint having an adapter integrated into a pipe of the assembly according to one embodiment.

As discussed above, the adapter 20 can be secured to the outer surface of the end portion 16 using any of various securing techniques, such as welding, adhesion, fastening, and the like. Further, the adapter 20 can be made from any of various rigid materials, such as metal and metal alloys, composites, ceramics, etc. The adapter 20 includes at least one attachment surface 21 that is supported by and contacts the end portion 16 of the first pipe 12. Using welding techniques, the adapter 20 is welded to the end portion 16 at or adjacent the attachment surfaces 21. Accordingly, the thickness of the adapter 20 at the attachment surfaces 21 is sufficiently large to support a robust weldment between the adapter 20 and the end portion 16, as well as to prevent breakage of the adapter 20 along the attachment surfaces 21. Alternative to separately forming the adapter 20 and attaching it to the pipe 12 is a separate and future process, the adapter can be integrated into the end portion of a pipe to form a one-piece monolithic structure with the pipe. For example, according to one embodiment shown in FIG. 7, an adapter 100 is integrated into an end portion 110 of a pipe 120. In certain implementations, such as the illustrated implementation, the adapter 100 is formed in the wall of the first pipe 120. Accordingly, the adapter 100 can have the same thickness as the wall of the first pipe 120. The adapter 100 can include the same curved surfaces as the adapter 20 and be utilized with the same gasket, flared end portion, and clamp as the adapter 20 to form a spherical flange joint. In certain instances, the integrated adapter 100 can reduce the manufacturing costs associated with a joint compared to the adapter 20.

Figure 4:
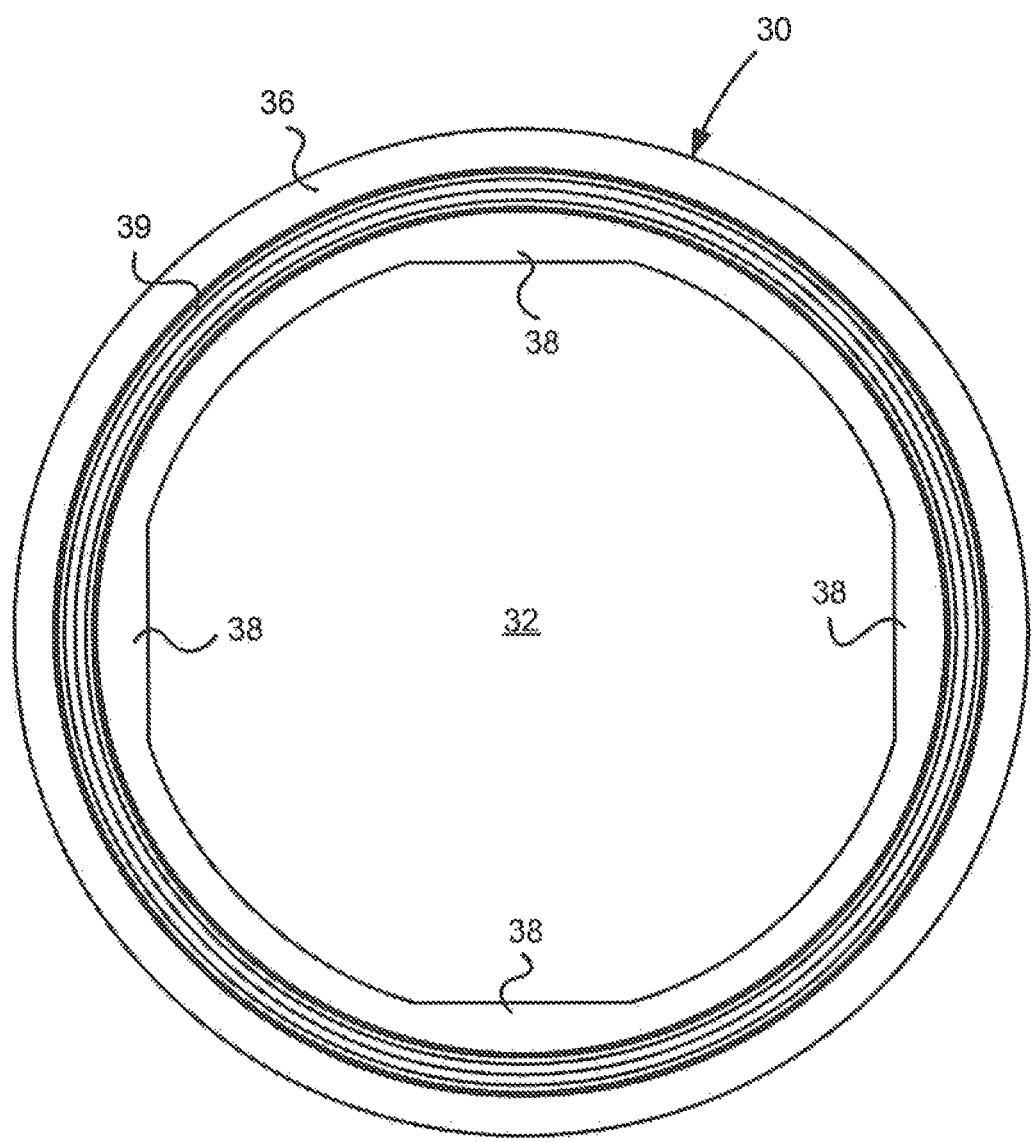
FIG. 4 is a frontal view of a gasket of a spherical flange joint according to one embodiment.

The gasket 30 is positioned between the downstream surface 24 of the adapter 20 and the flared end portion 18 of the second pipe 14, The gasket 30 has a substantially annular shape (see FIG. 4) with a central opening 32 through which the end portion 16 of the first pipe 12 extends. The gasket 30 includes upstream and downstream. surfaces 34, 36, respectively (see, e.g., FIG. 2). The upstream surface 34 is concave (e.g., inwardly rounded or curved) and the downstream surface 36 is convex. Each of the upstream and downstream surfaces 34, 36 of the gasket 30 defines a respective curve having a radius corresponding with the radius of the downstream surface 24 of the adapter 20, In other words, the radius of the upstream surface 34 of the gasket 30 is approximately equal to the downstream surface 24 of the adapter 20 and the radius of the downstream surface 36 of the gasket is approximately equal to the radius of the upstream surface of the gasket plus the thickness of the gasket.

When assembled, as shown in FIG. 2, the gasket 30 forms the same included angle with respect to the central axis 50 as the downstream surface 24 of the adapter 20. In this manner, the concave upstream surface 34 of the gasket 30 matingly engages or nestably receives the convex downstream surface 24 of the adapter 20. In other words, the concave upstream surface 34 rests substantially flush against the convex downstream surface 24.

Referring back to FIG. 4, the gasket 30 includes a plurality of tabs 38 formed about a periphery of the opening 32. The tabs 38 are configured to properly position, center, and at least partially secure the gasket 30 on the end portion 16 of the first pipe 12. In certain implementations, the opening 32 has a diameter that is slightly larger than an outer diameter of the end portion 16 to reduce or eliminate interference between the opening and the end portion, which may be caused by manufacturing variance resulting from the manufacture of the first pipe 12 and/or gasket 30. The tabs 38 extend into the opening 32 such that the distance between opposing tabs is less than the outer diameter of the end portion 16.

Accordingly, when placed about the end portion 16, the tabs 38 are interfered with by the end portion 16 (e.g., deform, flex, or deflect when positioned around the end portion). The interference forces between the tabs 38 and end portion 16 act to ensure proper retaining, positioning, and centering of the gasket 30 relative to the end portion even with manufacturing variance in the first pipe 12 and/or gasket (see FIG. 2). The gasket 30 rests against and is supported by the end portion 16 of the first pipe 12, more specifically the ledge 62 of the first pipe, such that the gasket holds itself in place during assembly of the joint 10, whether for horizontal, vertical, or other installations. In this manner, a user or installer need not manually hold the gasket 30 in place during assembly of the joint 10. Supporting and retaining the gasket 30 using the ledge 62 of the first pipe 12 in this manner provides a more secure and robust assembly than if the gasket was supported and retained solely by the adapter 20.

Additionally, in certain implementations, because the gasket 30 is supported directly by the first pipe 12, the gasket covers substantially the entire upstream surface 24 of the adapter 20 from the downstream attachment surface 21 to nearly an outer periphery of the adapter. In this manner, no portion of the upstream surface 24 is exposed to the flared end portion 18. Therefore, the flared end portion 18 is prevented from contacting and potentially damaging the adapter 20 during or after assembly.

The gasket 30 is configured to provide a seal between the adapter 20 and flared end portion 18 of the second pipe 14. In certain implementations, the gasket 30 is made from a flexible material, such as rubber, foam, silicone, polymers, graphite, and the like. In some implementations, the flexible material is deformable, compressible, and/or resilient. As the clamp 40 is tightened, the gasket 30 presses and at least partially deforms against the adapter 20 and flared end portion 18 to create a seal or barrier between the adapter and flared end portion. In other words, the gasket 30 promotes the elimination of openings between the gasket, adapter 20, and flared end portion 18. However, inconsistencies caused during manufacturing can create variances in the adapter 20, gasket 30, and/or flared end portion 18, which can lead to wider gaps between the gasket and the adapter and/or flared end portion. To this end, the gasket 30 may include, in certain implementations, an elevated annular ridge 39 (e.g., bump) formed in the downstream surface 36 of the gasket (see, e.g., FIGS. 2 and 4). The annular ridge 39 is configured to ensure a seal is created between the gasket 30 and the flared end portion 18 in the event the adapter 20 or flared end portion is non-uniform, or has inconsistencies or manufacturing variances. In other embodiments, the gasket 30 may include an elevated annular ridge on the upstream surface 34 instead of or in addition to the elevated annular ridge 39 on the downstream surface 36.

Figure 5:
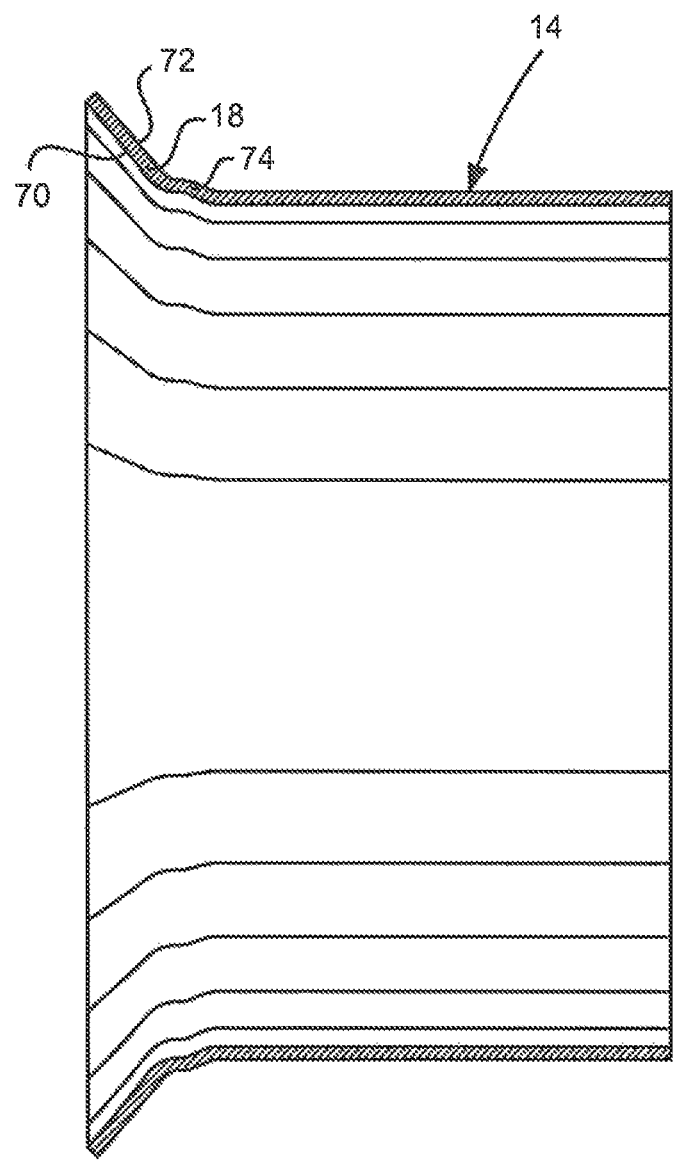
FIG. 5 is a cross-sectional side view of a flanged end of a pipe according to one embodiment.

Referring to FIG. 5, the flared end portion 18 of the second pipe 14 includes upstream and downstream flared surfaces 70, 72, respectively, and a step 74. The upstream flared surface 70 is concave and the downstream flared surface 72 is convex. The upstream flared surface 70 of the flared end portion 18 defines a curve having a radius corresponding with the radius of the convex downstream surface 36 of the gasket 30. In other words, the radius of the upstream flared surface 70 of the flared end portion 18 is approximately equal to the downstream surface 36 of the gasket 30 and the radius of the downstream flared surface 72 of the flared end portion is approximately equal to the radius of the upstream surface of the flared end portion plus the thickness of the flared end portion.

When assembled, the upstream flared surface 70 of the flared end portion 18 matingly engages or nestably receives the convex downstream surface 36 of the gasket 30, Accordingly, the concave upstream flared surface 70 rests substantially flush against the convex downstream surface 36. In the event the upstream flared surface 70 does not sit flush against the convex downstream surface 36 of the gasket 30 due to manufacturing abnormalities, or otherwise, the annular ridge 39 of the gasket is configured to ensure a seal is created between the gasket 30 and the flared end portion 18.

The step 74 of the flared end portion 18 facilitates the coupling and misalignment of the second pipe 14 to the first pipe 12 where the outside diameter of the second pipe is the same as or similar to the outside diameter of the first pipe. In other words, even if the outside diameters of the first and second pipes 12, 14 are the same, the second pipe still can be axially misaligned with and sealed to the first pipe because of the step 74. Generally, the inside diameter of a pipe is directly proportional to the outside diameter of a pipe. In other words, the larger or smaller the outside diameter of a pipe, then the larger or smaller, respectively, the inside diameter of the pipe. Accordingly, because the joint 10 facilitates the coupling and misalignment of pipes having similar outside diameters, the joint also facilitates the coupling and misalignment of pipes having similar inside diameters, which corresponds with a decrease in the pressure drop across the pipes compared to dissimilar inside diameters.

Figure 6:
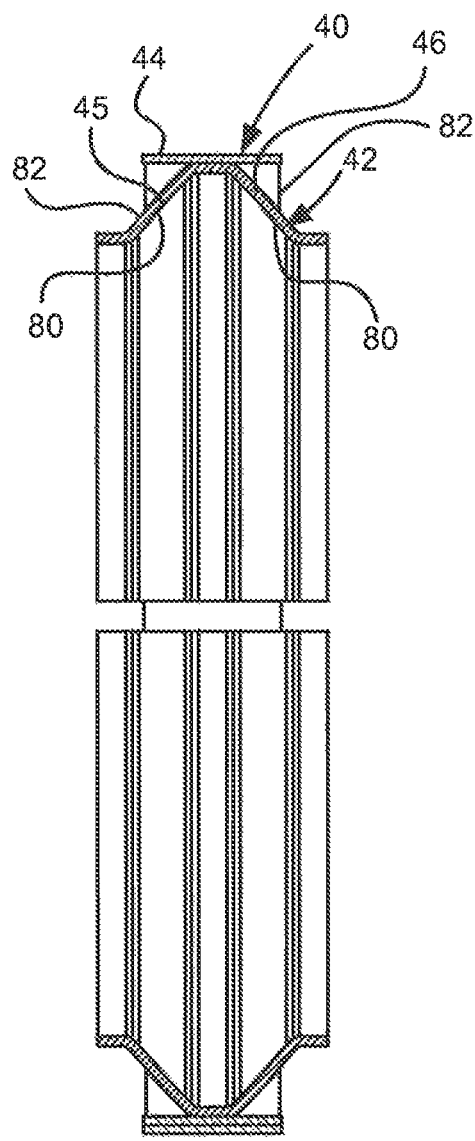
FIG. 6 is a cross-sectional side view of a clamp of a spherical flange joint according to one embodiment.

Referring to FIG. 6, the clamp 40 includes a substantially annular V-band 42 and tension strap 44. The V-band 42 and tension strap 44 cooperatively urge the flared end portion 18 against the gasket 30 and adapter 20, as well as the adapter against the gasket 30, The tension strap 44 can be adjusted via a fastening mechanism 48 (see FIG. 1) to tighten the V-band 42 against the flared end portion 18, gasket 30, and adapter 20, which ultimately forms the joint between the first and second pipes 12, 14. The V-band 42 includes two angled walls 45, 46 each having inner and outer surfaces 80, 82. At least one, and preferably both, of the inner surfaces 80 is concave and defines a curve having the same radius as the downstream flared surface 72, which corresponds with the radii of the downstream surfaces 36, 24 of the gasket 30 and adapter 20, respectively. In this manner, either of the concave inner surfaces 80 can matingly engage or nestably receive the convex downstream flared surface 72 of the second pipe 14. In other words, a concave inner surface 80 of the clamp 40 can rest substantially flush against the convex downstream flared surface 72.

The other of the inner surfaces 80 (i.e., the inner surface not matingly engaged with the downstream flared surface 72) is configured to matingly engage or nestably receive the upstream surface 22 of the adapter 20. As discussed above, the upstream surface 22 of the adapter 20 has a slightly larger radius than the downstream surface 24. More specifically, in some embodiments, the radius of the upstream surface 22 is approximately equal to the radius of the downstream flared surface 72 of the second pipe 14. Because the surfaces to which the inner surfaces 80 of the V-band 42 are matingly engageable have the same radius, the inner surfaces 80 can also have the same radius, which allows for the clamp 40 to be symmetrical. Providing a symmetrical clamp 40 can eliminate installation errors and time commonly associated with clamps having designated and differently configured upstream and downstream sides.

As discussed above, the radii of the curved mating surfaces correspond with each other and can be the same in certain embodiments. Moreover, the radii can be different based on the diameters of the first and second pipes 12, 14. For example, for pipes having a first diameter (e.g., four inches), the radius of the downstream surface 24 of the adapter 20 can have a first dimension (e.g., 90 mm). In contrast, for pipes having a second diameter (e.g., five inches), the radius of the downstream surface 24 of the adapter 20 can have a second dimension (e.g., 110 mm) different than the first dimension. In this manner, the joint 10 allows for similar misalignment capability for differently sized pipes.

Figure 8:
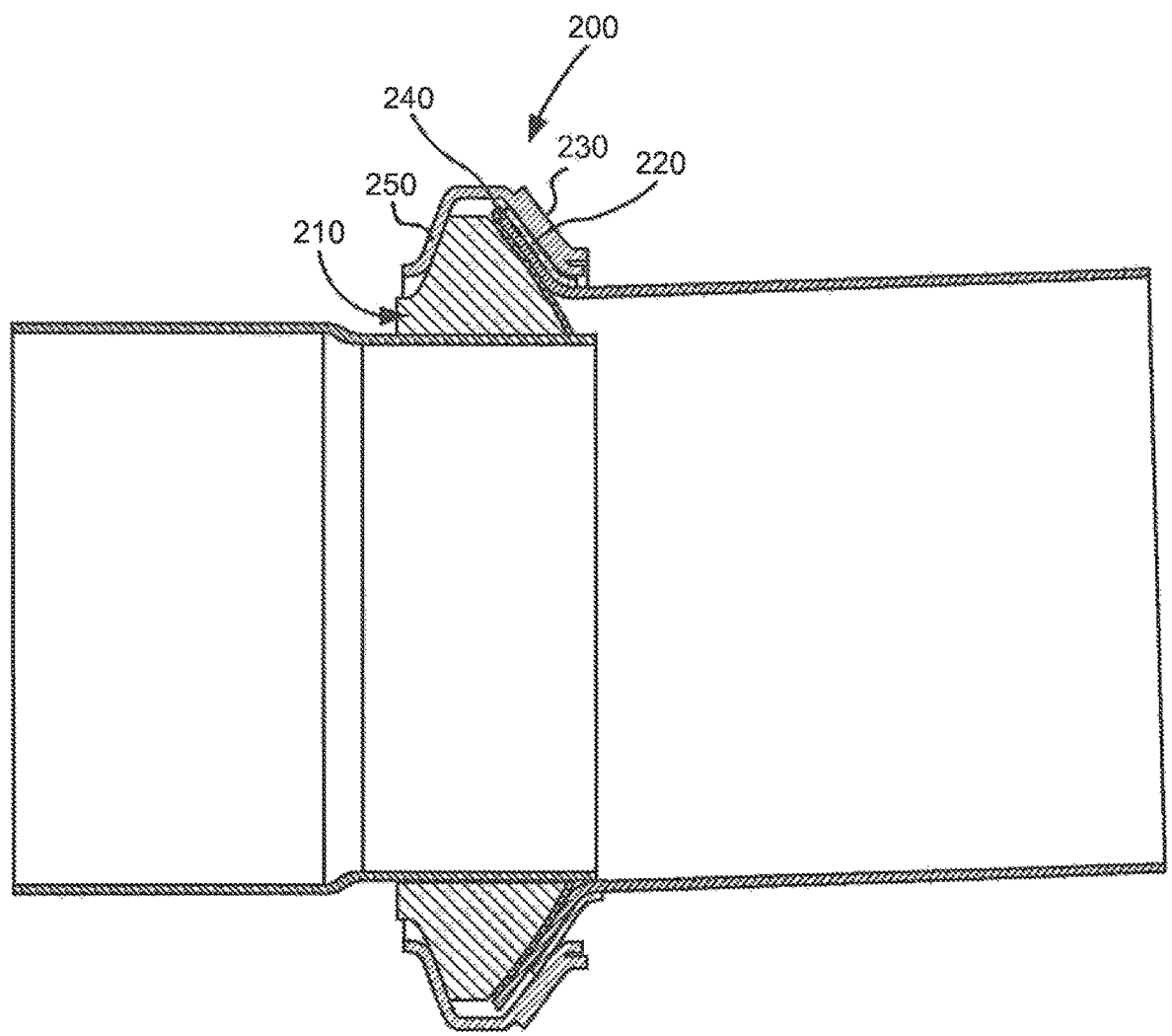
FIG. 8 is a cross-sectional side view of a pipe assembly with a spherical flange joint having reinforcement members according to one embodiment.

Referring to FIG. 8, a joint 200 is shown that is similar to joint 10 except the adapter 210 does not have a hollow interior and the joint 200 includes annular reinforcement features or rings 220, 230. The reinforcement feature 220 is positioned between a flared end portion 240 of a downstream pipe and a clamp 250. The reinforcement feature 220 can have a curvature corresponding to the curvature of the flared end portion 240 and clamp 250. More specifically, the reinforcement feature has an upstream surface with a radius of curvature that is the sane as the radius of curvature of a downstream surface of the flared end portion 240, and a downstream surface with a radius of curvature that is the same as the radius of curvature of an upstream or inner surface of the clamp 250. In certain implementations, the reinforcement feature 220 is made from a rigid material. The reinforcement feature 230 can be integrated into the clamp 250 or secured to an outer surface of the clamp, The reinforcement features 220, 230 provide additional strength and stress reduction to the joint 200.

Although the above description uses descriptive terms such as "upstream" or "downstream," such descriptions are relative to the specific orientation of the joint 10 in the illustrated embodiments relative to a fluid flow through the pipes. One of ordinary skill in the art will recognize in view of this disclosure that the descriptive terms may be reversed should the orientation of the joint 10 or the direction of flow be reversed.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pipe assembly, comprising:
a first pipe comprising a first end portion;
a second pipe comprising a flared end portion having a curved wall with a specific curvature;
an adapter coupled to the first pipe, the adapter comprising a curved surface, the adapter comprising a convex surface with a first radius of curvature;
a gasket positioned between the curved wall of the flared end portion and the curved surface of the adapter, the gasket comprising a first surface and a second surface, the first surface being concave and having a second radius of curvature, and the second surface being convex and having a third radius of curvature, wherein the gasket is supported on the first pipe;
a clamp comprising a curved surface, the clamp comprising an inner surface being concave and having a fourth radius of curvature, the clamp being tightenable to secure the curved wall of the flared end portion against the gasket and the gasket against the curved surface of the adapter; and
a first annular reinforcement ring positioned between the flared end portion of the second pipe and the clamp;
wherein the first radius of curvature is equal to the second radius of curvature;
wherein the first radius of curvature and the second radius of curvature are each less than the third radius of curvature; and
wherein the third radius of curvature is less than the fourth radius of curvature.

2. The pipe assembly of claim 1, wherein the gasket has a substantially annular shape defining a central opening slightly larger than an outer periphery of the first pipe, and wherein the gasket comprises at least one set of opposing tabs extending at least partially into the opening, a maximum distance between the opposing tabs being less than a diameter of the first pipe.

3. The pipe assembly of claim 1, wherein the gasket forms a seal between the adapter and the flared end portion of the second pipe, and wherein the seal is maintained when the second pipe is misaligned relative to the first pipe.

4. The pipe assembly of claim 1, wherein the gasket extends radially outwardly from the first pipe to approximately a radially outermost periphery of the adapter.

5. The pipe assembly of claim 1, further comprising a second annular reinforcement ring positioned on an outer surface of the clamp.

6. The pipe assembly of claim 5, wherein the second annular reinforcement ring is integrated into the clamp.

7. The pipe assembly of claim 1, wherein the adapter is formed in a wall of the first pipe.

8. The pipe assembly of claim 1, wherein the adapter does not possess a hollow interior.

9. The pipe assembly of claim 1, wherein the first annular reinforcement ring has a curvature corresponding to the fourth radius of curvature.

10. The pipe assembly of claim 1, wherein the first annular reinforcement ring has a curvature corresponding to the specific curvature.

11. The pipe assembly of claim 1, wherein the gasket comprises a ridge formed in at least one of the first and second surfaces of the gasket.

12. The pipe assembly of claim 1, wherein the adapter has a generally V-shaped cross-section.

13. A flange joint, comprising:
an adapter capable of being coupled to a first pipe, the adapter comprising a convex surface with a first radius of curvature;
a gasket comprising a first surface and an opposite second surface, the first surface of the gasket being matingly engageable with the convex surface of the adapter, the second surface capable of being matingly engageable with a second pipe, the first surface being concave and having a second radius of curvature, and the second surface being convex and having a third radius of curvature, wherein the gasket is capable of being supported on the first pipe;
a clamp comprising an inner surface capable of being matingly engageable with the second pipe to secure the gasket to the adapter, the inner surface being concave and having a fourth radius of curvature; and
a first annular reinforcement ring capable of being positioned between a flared end portion of the second pipe and the clamp;
wherein the first radius of curvature is equal to the second radius of curvature;
wherein the first radius of curvature and the second radius of curvature are each less than the third radius of curvature; and
wherein the third radius of curvature is less than the fourth radius of curvature.

14. The flange joint of claim 13, further comprising a second annular reinforcement ring positioned on an outer surface of the clamp.

15. The flange joint of claim 14, wherein the gasket comprises a ridge formed in at least one of the first and second surfaces of the gasket.

16. The flange joint of claim 14, wherein the adapter has a generally V-shaped cross-section.

17. The flange joint of claim 14, wherein the gasket is configured to form a seal between the adapter and a flared end portion of the second pipe, and wherein the seal is configured to be maintained when the second pipe is misaligned relative to the first pipe.

18. The flange joint of claim 14, wherein the second annular reinforcement ring is integrated into the clamp.

* * * * *